Aug. 21, 1956  SHAO WEN YUAN ET AL  2,759,548
LIFT ROTOR CONTROL
Filed April 2, 1953  4 Sheets-Sheet 4
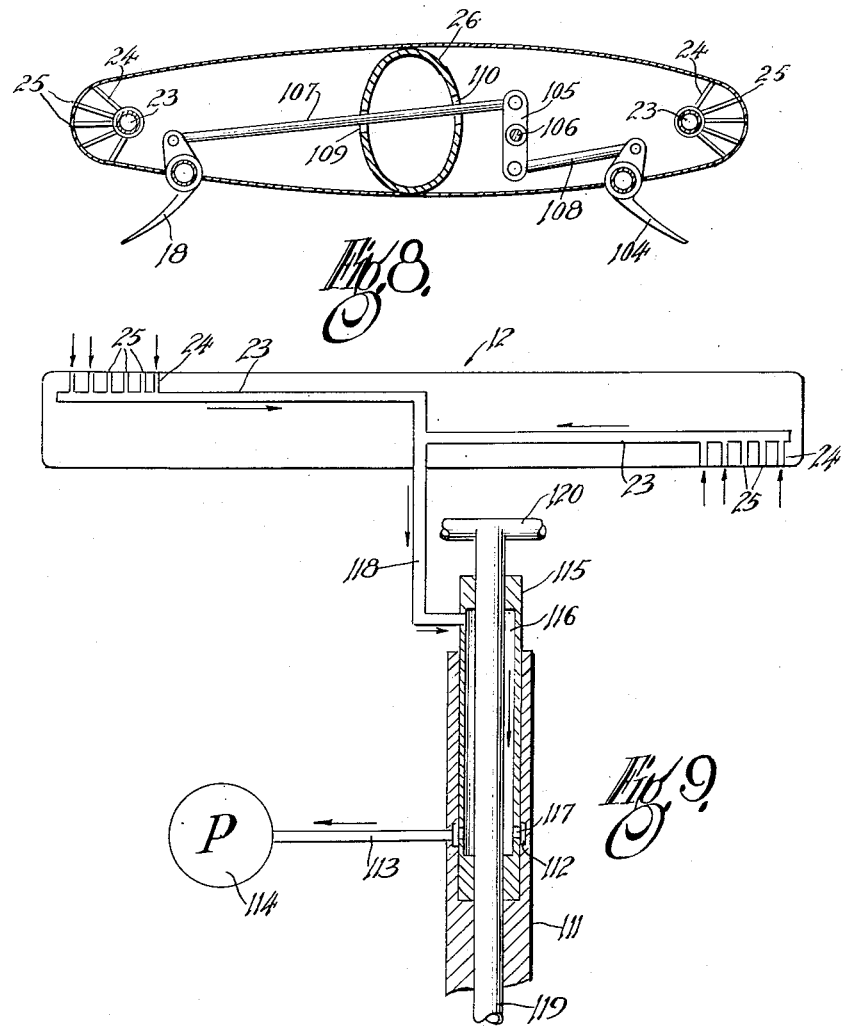
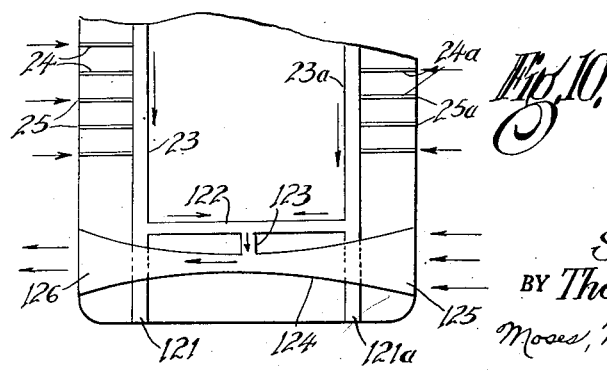
INVENTOR.
Shao Wen Yuan
BY Theodore Von Kármán

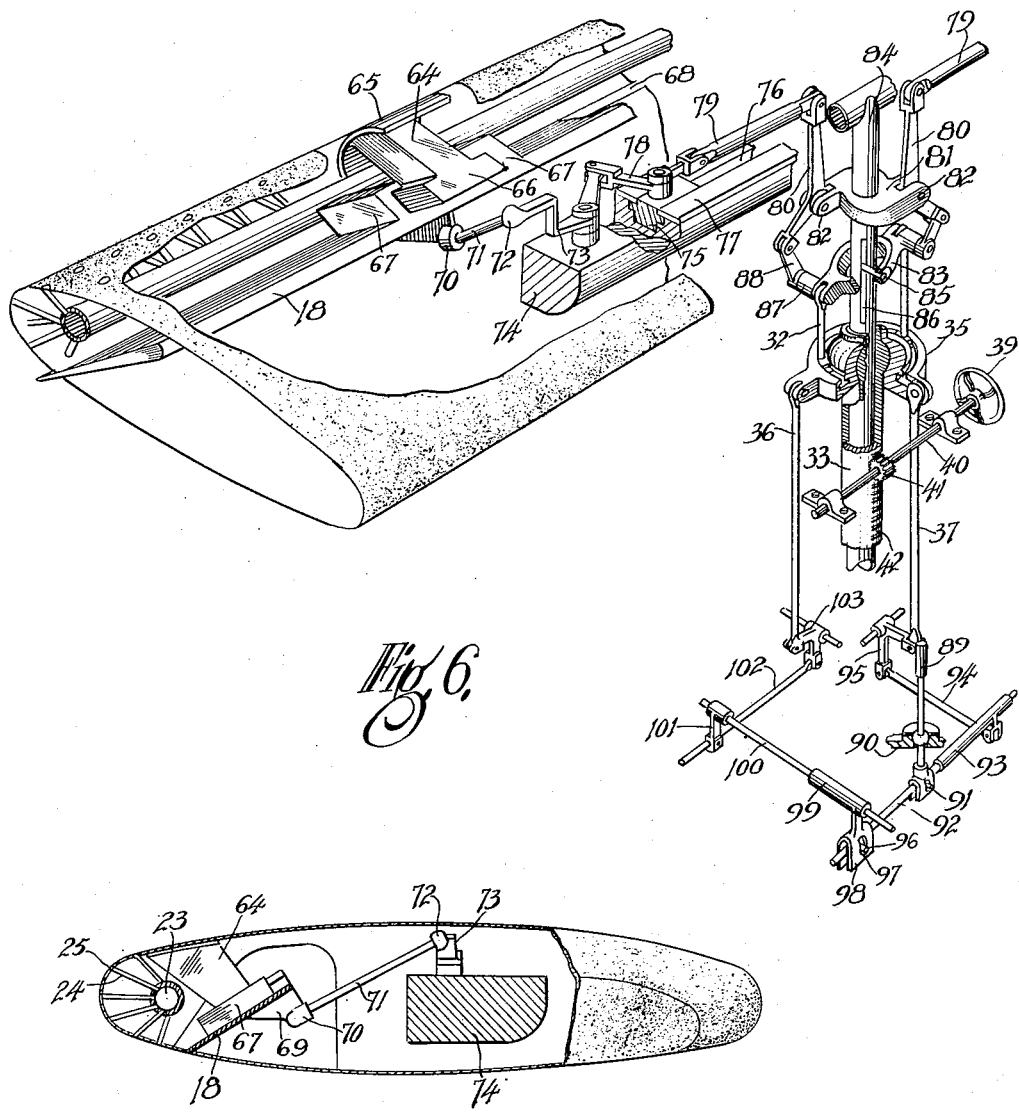

2,759,548

United States Patent Office

Patented Aug. 21, 1956

2,759,548

LIFT ROTOR CONTROL

Shao Wen Yuan, New York, N. Y., and Theodore Von Kármán, Pasadena, Calif.

Application April 2, 1953, Serial No. 346,326

20 Claims. (Cl. 170—135.4)

The present invention relates to aircraft of the rotary wing type such as helicopters, autogiros, gyrodynes, compound airplanes and the like, including lifting cranes, the invention being directed to improvements which increase the aerodynamic efficiency of the rotor blades and improve both the performance and the maximum speed of the aircraft.

When applied to a lifting crane, the invention provides a much greater lifting force than lifting cranes using a rotor of conventional design.

During the forward flight of such an aircraft, which will be considered by way of example and for purposes of illustration to be a helicopter, the rotating rotor blades which produce the lift also cause the horizontal movement of the helicopter. As a result, each blade during one half of a complete revolution is traveling in an advancing direction with respect to the direction of flight, and during the other half of its revolution, is retreating or traveling against the direction of flight so that its velocity relative to the air is reduced. Thus, when the position of the blade is momentarily normal to the direction of travel of the aircraft, in one such position its air speed is that produced by the speed of rotation of the blade to which the air speed of the helicopter is added, and in the other such position the air speed of the helicopter is subtracted from the speed of the blade caused by its rotation.

The air speed of the rotor blades thus varies in a more or less sinusoidal fashion between a maximum value during its forward travel and a minimum value during its rearward travel. This variation in air speed produces a variation in lift and this variation becomes greater as the air speed of the helicopter increases. This difference in lift tends to cause rolling of the helicopter, since the lift is greater on one side of its line of flight than on the other.

In order to overcome this rolling tendency, it has been proposed to vary the pitch of each blade cyclically throughout its complete revolution. This expedient, however, has not proven entirely satisfactory because the angle of attack to which the blades may be adjusted has a maximum limiting value beyond which the tips of the blades begin to stall, and this produces excessive vibration and also impairs the over-all efficiency of operation of the helicopter.

Another attempted solution of the problem of roll has been to divide the rotor blade chordwise into two articulated sections and to provide means for cyclically adjusting the angular position of the trailing edge section relative to the forward section of the blade so as to add lift to the blade during its retracting period. While this trailing edge section of the blade has been loosely referred to as a "flap," functionally it constitutes a component part of the blade proper so that an adjustment of its angle effects a change in the camber of the blade itself. A disadvantage of this construction is that the increases in the lift coefficients are comparatively small for relatively wide changes in angle of the flap. Furthermore, such gain in lift is far outweighed by the increased profile drag coefficient and pitching moment coefficient resulting from the change in camber. Thus, the lift produced by simply varying the flap angle without simultaneously changing the pitch of the blade is not sufficient to prevent rolling of the helicopter except at slow forward speeds.

In any event, there is a definite limit of the forward speed of the conventional helicopters because of the loss of lift in part of the retreating blade in the reverse flow region. When the forward speed is equal to the rotating speed, the retreating blade at one instant would have no lift at all.

It is an important object of the present invention to provide a rotor blade for helicopters having new and improved means for altering its lift characteristic during its rotation so that a very high lift is imparted to the blade without the necessity of changing the angle of attack or the camber of the blade.

For accomplishing the foregoing object, the invention more particularly contemplates the use of a rotor blade having a cross-sectional shape which resembles an elongated flattened oval with a supplemental flap capable of being adjustably displaced with respect to the blade so as to attain the desired very high lift.

Consider a circular cylinder moving through a stationary fluid. If the potential flow is calculated about a circular cylinder corresponding to an arbitrary circulation, the two symmetrical dividing streamlines are known, a lift coefficient of $4\pi$ is obtained if the two stagnation points have come into coincidence at the bottom point of the cylinder. The general effect of the circulation is to increase the relative speed of the fluid at surfaces above the stagnation points of the cylinder, and to diminish the speed at surfaces below. Thus the pressure above is diminished and the pressure below is increased, and therefore there will be an upward force on the cylinder in the direction perpendicular to the flow direction. If a thin flap of certain short length be placed along the rear calculated dividing stream line corresponding to certain circulation, approximately the same lift would be produced on the cylinder.

Similarly the above theory holds true for an oval shaped airfoil instead of a cylinder, however, the magnitude of the lift coefficient is somewhat smaller depending on its thickness ratio.

In order to direct the flow of the air stream upon the upper side of the blade around its trailing edge and smoothly off the end of the flap, continuous suction around the trailing edge is applied.

Another important object of the invention is to provide an oval shaped rotor blade system for helicopters and applying continuous suction around the leading edges of the blades during their retreating interval. This would give the portion of blade which experiences reverse flow the lift similar to that of the other sections which experience the forward flow condition. Hence this scheme would eliminate the forward speed limitation of the conventional helicopters.

Still another object of the invention is to provide a system of oval shaped blades for a helicopter, the blades having new and improved means for cyclically altering their lift characteristics during their rotation so that additional lift is imparted to each blade throughout the retreating portion of its cycle without the necessity of changing the angle of attack or the camber of the blade.

A further object of the invention is to provide a helicopter rotor blade of the above character having control means operable by the pilot for changing the magnitude of the lift imparted by means of the flap and for attaining directional control of the helicopter while in flight.

Still a further object of the invention is to provide several sections of flaps along the span of the blade with different initial positions of the flaps with respect to the blades. This would give different lift coefficients along the blade section which in turn gives a favorable lift distribution along the length of the blade.

Other and further objects and advantages of the invention will become apparent upon reading the following specification together with the accompanying drawing forming a part hereof.

Referring to the drawing:

Figure 6 is a fragmentary perspective view showing still another modified form of the invention;

Figure 7 is an end view of a rotor blade, partly broken away, showing the modified form of the invention illustrated in Figure 6;

Figure 8 is a transverse sectional view of a rotor blade showing a further modified form of the invention;

Figure 9 is a diagrammatic representation of a system of suction ducts; and

Figure 10 is a diagrammatic fragmentary view of a tip of a rotor blade showing a double system of suction ducts.

Figure 1:
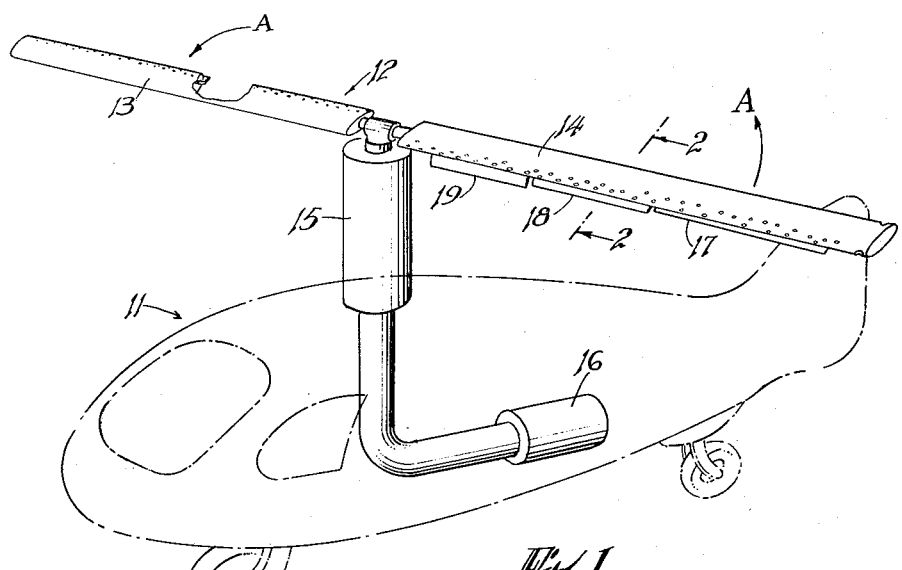
Figure 1 is a perspective view of a helicopter equipped with a rotor embodying the invention, one of the blades being shown partly broken away.

Referring to Figure 1, a helicopter designated generally as 11 is shown provided with a two-bladed rotor designated generally as 12, which comprises the individual blades 13 and 14. Although a two-bladed rotor is shown in Fig. 1 for purposes of illustration, the invention may be applied to a rotor having any desired number of blades. The rotor 12 is supported by suitable means 15 for rotation in the direction indicated by the arrows "A," power being supplied from a power plant 16 which may be an internal combustion engine, or may be a turbo-jet or similar type of engine whose exhaust gases are carried to the tips of the rotor blades to drive the rotor in known manner.

Figure 2:
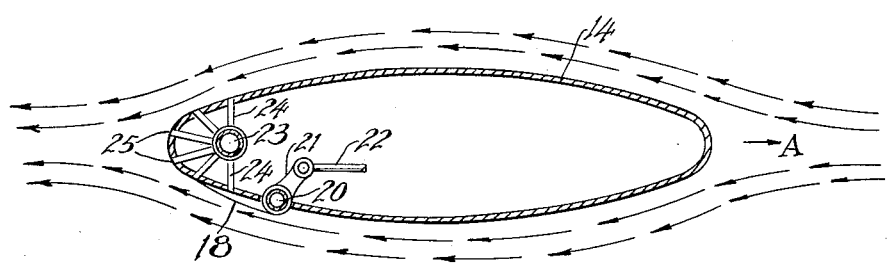
Figure 2 is a partial transverse sectional view taken along the line 2—2 of Figure 1, looking in the direction of the arrows, a movable flap being shown positioned adjacent to the surface of the blade.
Figure 3:
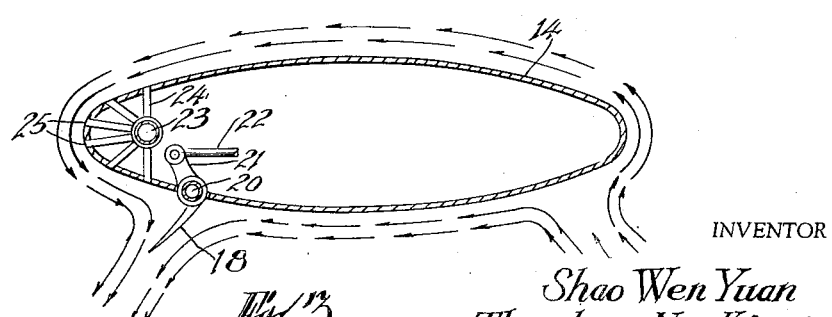
Figure 3 is a sectional view similar to Figure 2 with the movable flap shown extending downwardly to produce increased lift.

The rotor blades 13 and 14 are illustratively shown provided with outboard, intermediate and inboard flaps 17, 18 and 19 respectively which may be adjusted from the position in close proximity to the rotor blade shown in Figure 2 to a downwardly extending position as shown in Figure 3, the lift being at its maximum value with the flaps positioned as shown in Figure 3. A fewer or a greater number of flaps may be provided, as desired, instead of the three flaps illustrated by way of example.

In Figure 2, the flap 18 is shown rotatably mounted on a shaft 20 and is provided with an arm 21 pivotally connected to a control rod 22 for movement of the flap 18 as hereinafter described.

As shown in Figure 2, the cross-sectional configuration of the rotor blades 13 and 14 is oval or elliptical. In the position of the rotor blade 14 as shown in Figure 1, the oval configuration is symmetrical about a generally horizontal axis.

A suction duct 23 extends along the inside of the trailing edge of the rotor blade and communicates through a plurality of small suction tubes 24 with suction apertures 25 disposed around the trailing edge of the rotor blade. As shown in Figure 3, when the flap 18 is in its downward position to obtain increased lift, the suction effect at apertures 25 draws the air around the trailing edge of the rotor blade to obtain the required lift.

Figure 4:
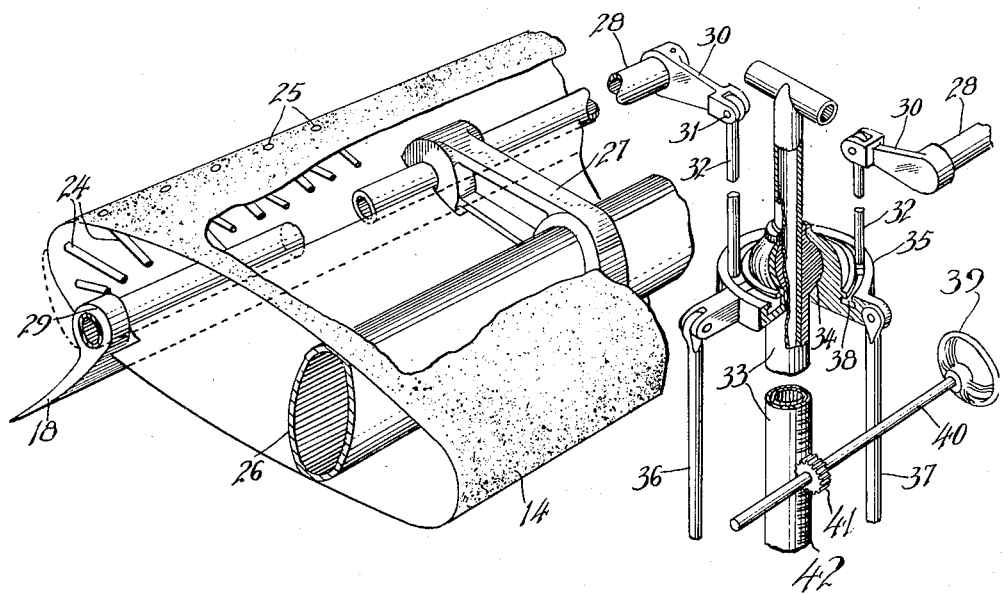
Figure 4 is a fragmentary perspective view illustrating the operation of an embodiment of the invention.

Referring to Figure 4, the rotor blade 14 is shown provided with a longitudinally extending tubular spar which gives the blade the necessary stiffness. Extending from the spar 26 toward the trailing edge of the blade are a plurality of spaced supporting brackets 27, only one bracket being shown for simplicity of illustration.

Suitably journaled in the brackets 27 is a hollow shaft 28 which carries a flap 18 fixedly connected thereto at spaced points therealong by ears 29 which extend into the interior of the blade. A flap actuating arm 30 is fixed at one end to the inboard end of hollow shaft 28, the opposite end of arm 30 being bifurcated and pivotally connected at 31 to a vertically reciprocable T-headed rod 32.

A vertically movable hollow tubular member 33 terminates at its upper end in a ball portion 34. Universally movably mounted on ball portion 34 is a non-rotating swash plate 35 whose plane may be displaced from the horizontal in any desired direction by means of the two control rods 36 and 37 which are independently movable for this purpose. Formed in the upper surface of swash plate 35 is a circular groove 38 of inverted T-shaped cross-section. The T-shaped heads of the vertically reciprocable rods 32 are freely movable around the circular groove 38 and their vertical positions will be governed by the vertical position of the groove 38 at each point around its circumference as the heads of the rods ride around therein.

If the plane of the groove 38 is horizontal, the vertically reciprocable rods 32 will not move as the rotor 12 revolves. If, however, the swash plate 35 is tilted, the rods 32 will be vertically displaced in accordance with the magnitude and direction of the tilt, thus cyclically varying the positions of the flaps in accordance with the position of the rotor blades.

The vertical position of swash plate 35 may be controlled by a hand wheel 39 which is secured to a shaft 40 which carries a pinion 41 meshing with rack teeth 42 formed on vertically movable hollow tubular member 33. With swash plate 35 horizontal, the flaps in both rotor blades 13 and 14 may be displaced simultaneously for control of the amount of lift produced by the flaps while the helicopter is hovering, and also determines the mean flap position about which the cyclic variation of flap position will take place when the swash plate 35 is tilted.

Figure 5:
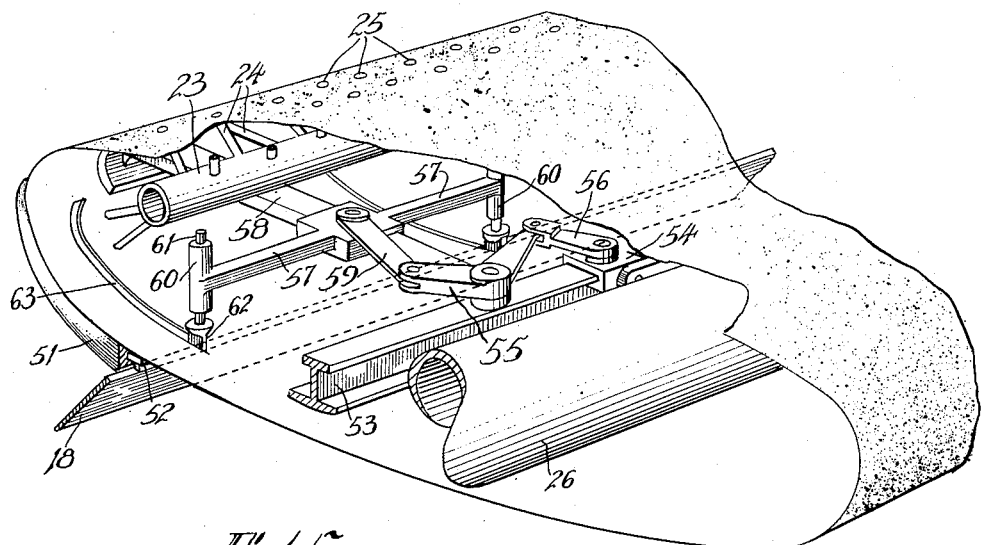
Figure 5 is a fragmentary perspective view of a portion of a rotor blade showing a modified form of the invention.

Figure 5 shows a modified form of the invention in which the flaps are slidably mounted in arcuate tracks which extend transversely of the rotor blade. An arcuate track 51 extends along the under side of the trailing edge of the rotor blade and is provided with a groove of T-shaped cross section open at the bottom which extends along the length of the track 51, a plurality of such tracks being provided for suitable support of the flap. The flap 18 is fixedly mounted on a plurality of supporting blocks 52 of T-shaped cross section which are slidably disposed in the grooves of the arcuate tracks 51, and which will change the angle of flap 18 as the blocks 52 move along the track 51. In this way, the angle of the flap is varied as its position with respect to the trailing edge of the rotor blade is varied.

A longitudinally extending I-beam 53 carries a block 54 slidably mounted on the upper side thereof. Movement of block 54 is controlled by mechanism such as that shown in Figure 6 and described below. A bell crank lever 55 is rotatably mounted on the upper side of I-beam 53 and is connected by a pivoted link 56 to sliding block 54. A cross-head 57 is slidably mounted on a guide member 58 and is connected by a link 59 with the bell crank lever 55. This linkage causes cross-head 57 to slide along guide 58 as block 54 slides along I-beam 53, the directions of sliding motion being mutually perpendicular, cross-head 57 being generally parallel to the trailing edge of the rotor blade and movable toward and away therefrom.

The ends of cross head 57 terminate in sleeves 60 which have vertically movable plungers 61 slidably disposed therein. The lower ends of plungers 61 terminate in extensions 62 which project downwardly through slots 63 in the lower trailing surface of the rotor blade, being pivotally connected to the leading edge of the flap 18 so that the flap may be moved toward and from the trailing edge of the rotor blade. As previously described, this movement changes the angle of the flap as well as its position along the tracks 51.

Figures 6 and 7 illustrate a further modified form of the invention, in which the flap is extended and retracted at a substantially constant angle with respect to the rotor blade.

A supporting block 64 is shown fixed to the inner surface of the trailing edge of the rotor blade by means of an arcuate projection 65 which may be fastened to the inner blade surface in any convenient manner. Block 64 is provided with a T-shaped portion 66 which is engaged by inwardly directed inverted L-shaped projections 67 of flap 18 so that flap 18 may slide freely along supporting block 64 at a constant angle with respect to the rotor blade. The rotor blade is longitudinally slotted at 68 permitting the flap 18 to be retracted or extended at will.

A downwardly extending projection 69 from flap 18 carries a universal connection 70 which is connected by a link rod 71 with a further universal connection 72 at the end of one arm of a bell crank lever 73. Bell crank lever 73 is pivotally mounted on a longitudinal supporting member 74. A sliding block 75 is freely movable in a slot 76 formed in supporting member 74, the slot 76 having laterally extending grooves engaged by lateral projections on block 75 for retaining the block 75 in the slot 76 in conjunction with the lateral plates 77 which engage the upper surfaces of the lateral projections of block 75.

Block 75 is connected by a link 78 with bell crank lever 73 and the complete linkage causes longitudinal sliding of block 75 in slot 76 to produce a corresponding extension or retraction of flap 18 with respect to the rotor blade.

In order to obtain the requisite longitudinal movement of block 75, it is connected by a link 79 with a bell crank lever 80 which is mounted in a supporting collar 81 provided with offset bifurcated portions 82 between which the bell crank lever 80 is pivoted.

The vertically reciprocable T-headed rods 32 are pivoted to opposite ends of a yoke 83 having an enlarged central aperture therein encircling a vertically extending suction pipe 84 which carries suction to the suction pipes 23 in the rotor blades. Inwardly extending guide pins 85 are slidable in shallow grooves 86 on opposite sides of suction pipe 84 and serve to guide yoke 83 for vertical movement along the suction pipe 84. Yoke 83 is provided with laterally extending studs 87 which are connected by links 88 to the bell crank levers 80. The length of the studs 87 is such as to provide an offset equal to the offset of the bifurcated portions 82 of supporting collar 81 and the amount of this offset is sufficient to bring the bell crank levers 80 into alignment with the slots 76 in supporting members 74, permitting these supporting members 74 to be located toward the trailing edge of the rotor blade and displaced from the longitudinal axis thereof.

Figure 6 also shows a control system for the rods 36 and 37 which control the tilting of swash plate 35. A control lever 89 is universally mounted in a ball and socket support 90 which is fixedly secured to some convenient portion of the aircraft. The lower end of control lever 89 terminates in a fork 91 which is pivotally connected to a rod 92. A sleeve 93 is splined to rod 92 for rotation therewith and permits axial movement of rod 92 therethrough. Sleeve 93 is connected by a link rod 94 to a bell crank lever 95 which is in turn pivotally connected to the control rod 37. In this manner displacement of control lever 89 in a direction to cause lateral displacement of rod 92 and sleeve 93 will produce movement of control rod 37 with a corresponding tilting movement being imparted to the swash plate 35.

The other end of rod 92 carries a transverse pin 96 which is longitudinally slidable in elongated slots 97 in opposite sides of a fork 98. Fork 98 is carried by a sleeve 99 which is splined to a shaft 100 for sliding movement therealong and for rotation therewith. Shaft 100 carries an arm 101 fixedly connected thereto and arm 101 is connected by a link rod 102 to a bell crank lever 103 which is in turn connected to control rod 36. In this manner, longitudinal movement of rod 92 will cause vertical movement of control rod 36 and corresponding tilting movement of swash plate 35 without affecting control rod 37. Similarly, lateral movement of rod 92 unaccompanied by longitudinal movement affects only control rod 37. Conveniently, some well known means may be provided to insure that the axis of rod 92 always remains oriented in the same direction, such as the inclusion of means within the universal mounting 90 for preventing control lever 89 from rotating about its longitudinal axis.

Figure 8 shows a further modified form of the invention in which the flap 18 at the trailing side of the rotor blade is supplemented by a further flap 104 located near the leading side of the rotor blade. The flaps 18 and 104 are connected together for simultaneous operation through substantially equal angles by a linkage which comprises the link 105 which is centrally pivoted intermediate its ends at 106 and which is connected with the trailing edge flap 18 by a link rod 107 and with the leading edge flap 104 by the link rod 108. The longitudinal brace 26 is laterally apertured at 109 and 110 to permit passage therethrough of link rod 107. The control of the position of either flap 18 or 104 may be in accordance with that described above for Figure 4, the other flap being controlled through the linkage 105—107—108. Suction is to applied to both the leading and trailing edges of the blades as indicated by pipes 23, 24 and 25. Continuous suction is applied around the leading edge of the blade which is in the reverse flow region. As a result this gives the portion of the blade which experiences reverse flow, a lift similar to that of the other sections which experience the forward flow condition. Hence this form of construction eliminates the forward speed limitation of the conventional helicopter.

Figure 9 shows a detail illustrating means for delivering both suction and exhaust gases to the rotor. A stationary vertical member 111 is provided with an internal peripheral groove 112 which forms an annular chamber which communicates through a pipe or conduit 113 with source of suction 114 shown diagrammatically as a pump P.

Rotatably disposed in the vertical member 111 is hollow cylinder 115. The internal chamber 116 in cylinder 115 communicates through a ring of apertures 117 with the groove 112. The suction ducts 23 in the rotor blades communicate through a pipe 118 with the rotating cylinder 115 and its internal cavity 116, being further connected through the apertures 117 and annular groove 112 with the pump P through pipe 113. The cylinder 115 revolves with the rotor 12. The exhaust gas pipe 119 for driving the rotor 12 by means of jets (not shown) passes upwardly through the cylinder 115 and revolves therewith and with the rotor 12. At its upper end, exhaust gas pipe 119 is shown terminating in a T 120 for distribution of the propulsion gases to the two rotor blades.

Figure 10 shows a modified form of suction arrangement in which suction is provided at both the leading and the trailing edges of the rotor blades. Additionally, a combined centrifugal and venturi effect is used at the blade tips, either to provide all of the required suction or to provide additional suction for supplementing the pump P.

Two suction pipes 23 and 23a extend along the rotor blade and communicate with a plurality of orifices on the trailing edge through suction tubes 24 and a similar plurality of orifices 25a on the leading edge through a plurality of suction tubes 24a. The suction tubes 23 and 23a extend completely to the tip of the rotor blade terminating in blade tip orifices 121 and 121a, respectively, which produce a reduced pressure in suction pipes 23 and 23a in part by centrifugal action and in part by the high velocity air passing over these orifices as in an aspirator.

Additionally the suction pipes 23 and 23a are interconnected by a transverse pipe 122 and pipe 122 is connected at 123 with the throat of a venturi tube or passage. Air is scooped up at the open end 125 of venturi tube 124 at the leading edge of the rotor blade and is discharged at 126 at the trailing edge. Intermediate its ends at the constricted throat portion 123, a suction is produced in known manner.

We have described what we believe to be the best embodiments of our invention. We do not wish, however, to be confined to the embodiments shown, but what we desire to cover by Letters Patent is set forth in the appended claims.

We claim:

1. In a rotary wing aircraft of the class described, a rotor assembly including a wing of substantially elongated cross-section, a flap movably disposed on the wing in proximity to the trailing edge of said wing, control means for varying the position of said flap with respect to said wing, and a boundary layer control including suction means extending along said wing in proximity to the trailing edge of said wing.

2. An aircraft according to claim 1 in which said control means includes a portion rotatable with said blade and a portion fixed with respect to the rotation of said blade, said fixed portion of said control means comprising a swash plate having a circular groove formed therein and said rotatable portion of said control means comprising a member movable to vary the angle of said flap member and having a head portion movable around said groove in engagement therewith.

3. An aircraft according to claim 2, in which said swash plate may be tilted with respect to the axis of rotation of said blade for controlling the cyclical variation of the angle of said flap member.

4. A rotary wing aircraft of the class described, comprising: a rotor blade of symmetrical cross-section rotatable about a substantially vertical axis, said blade having a trailing edge portion with a plurality of apertures formed therein; a suction duct extending along said blade in proximity to the trailing edge of said blade and communicating with said apertures; a flap member extending longitudinally of said blade in proximity to the trailing edge of said blade and movable with respect thereto, said flap member being positioned in proximity to said apertured edge thereof; a tiltable and vertically movable member having a circular engaging surface substantially concentric with said vertical axis; and flap position varying means carried by said blade and connected to said flap, said position varying means comprising a portion in engagement with said circular engaging surface.

5. An aircraft according to claim 4 in which said flap is angularly movable about an axis substantially perpendicular to said vertical axis.

6. An aircraft according to claim 4 in which said movable flap is extendable from and retractable into said rotor blade.

7. An aircraft according to claim 4, in which said rotor blade is provided with a transversely extending arcuate track, said flap being movable along said track.

8. An aircraft according to claim 4, further comprising manually operable control means for varying the vertical position of said tiltable and vertically movable member and manually operable control means for causing cyclical variation of said movable flap.

9. In a rotary blade aircraft of the class described, a rotor assembly including a rotor blade having a substantially elongated flattened oval cross-sectional shape, a flap in proximity to the trailing edge of the rotor blade capable of being adjustably displaced with respect to the blade, and control means for varying the position of said flap with respect to said blade, in cooperation with a boundary layer control comprising an air duct extending along said blade in proximity to the trailing edge of the blade, said trailing edge having apertures formed therein communicating with said air duct.

10. A rotary wing aircraft as described in claim 1 wherein said boundary layer control comprises a suction duct extending along said wing in proximity to the trailing edge of said wing, said trailing edge having apertures formed therein communicating with said suction duct, which in cooperation with said flap control the boundary layer airstream passing over the leading edge of the wing so that the airstream draws around and under the trailing edge of the wing when the flap is outwardly disposed, and at that point said airstream passing over the leading edge of the wing joins the boundary layer airstream passing under the leading edge of the wing, both airstreams ultimately flowing downward and backward in a direction corresponding to the angle the outwardly disposed flap makes with the wing.

11. In a rotary wing aircraft having a substantially symmetrical flattened oval-shaped rotor blade, at least a movable flap member for said blade positioned in proximity to an edge portion of said blade, means for setting and cyclically controlling the position of said flap, suction means extending along said edge portion of said blade for cooperating with said flap to control the boundary layer of the air stream across said blade.

12. A rotary wing aircraft as described in claim 11, wherein said means for setting and cyclically controlling the position of said flaps includes a swash plate adjustably mounted with respect to the axis of rotation of said rotor.

13. A rotary wing aircraft as set forth in claim 12 wherein said swash plate is vertically adjustable with respect to the axis of rotation of said rotor blade to vary the amplitude of said flap.

14. In a rotary wing aircraft as set forth in claim 13 wherein said swash plate is tiltably adjustable with respect to the axis of rotation of said rotor blade to cyclically vary the angle of said flap.

15. A rotary wing aircraft of the class described comprising: a rotor blade of substantially oval cross-section rotatable about a substantially vertical axis, a flap member extending longitudinally of said blade in proximity to the trailing edge of said blade and movable with respect thereto, a tiltable and vertically movable member having a circular engaging surface substantially concentric with said vertical axis, and flap position varying means carried by said blade and connected to said flap member, said position varying means comprising a portion in engagement with said circular engaging surface.

16. A rotary wing aircraft of the class described comprising a rotor blade of substantially oval cross-section rotatable about a substantially vertical axis, a flap extending longitudinally of said blade in proximity to the trailing edge of said blade, flap position varying means carried by said blade and connected to said flap for moving said flap angularly about an axis longitudinal to said blade.

17. An aircraft, according to claim 16, including means for cyclically varying the angular position of said movable flap.

18. A rotary wing aircraft having a substantially flattened oval-shaped rotor blade, two movable flap members for said blade positioned, respectively, in proximity to the leading and trailing edge portions of said blade, means for setting and cyclically controlling the positions of said flap members, said control means comprising means for synchronizing the positioning of one flap member with the positioning of the other flap member.

19. In a rotary wing aircraft having a substantially flattened oval-shaped rotor blade, movable flap members for said blade positioned in proximity to the edge portions of said blade, means for setting and cyclically controlling the positions of said flap members, said means including means for simultaneously moving said flap members through substantially equal angles, said last means comprising a centrally pivoted link, a first link means pivotally connecting one side of said centrally pivoted link to one flap member, and a second link means pivotally connecting the other side of said centrally pivoted link to the other flap member.

20. A rotary wing aircraft of the class described comprising a rotor blade of substantially oval cross-section rotatable about a substantially vertical axis, a flap extending longitudinally of said blade in proximity to the trailing edge of said blade and means for extending said movable flap from and retracting said movable flap into said rotor blade.

References Cited in the file of this patent

UNITED STATES PATENTS

| | | |
|---|---|---|
| 2,021,470 | Upson | Nov. 19, 1935 |
| 2,023,760 | Dornier | Dec. 10, 1935 |
| 2,394,513 | Chappedelaine | Feb. 5, 1946 |

FOREIGN PATENTS

| | | |
|---|---|---|
| 578,710 | Great Britain | July 9, 1946 |
| 931,296 | France | Oct. 6, 1947 |